US008874950B2

(12) United States Patent
Karnowski

(10) Patent No.: US 8,874,950 B2
(45) Date of Patent: *Oct. 28, 2014

(54) POWER MANAGEMENT FOR INPUT/OUTPUT DEVICES

(71) Applicant: Emulex Design & Manufacturing Corporation, Costa Mesa, CA (US)

(72) Inventor: Mark Joseph Karnowski, Costa Mesa, CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,713

(22) Filed: Mar. 11, 2013

(65) Prior Publication Data

US 2013/0195104 A1   Aug. 1, 2013

Related U.S. Application Data

(63) Continuation of application No. 12/731,095, filed on Mar. 24, 2010, now Pat. No. 8,397,092.

(51) Int. Cl.
*H04L 12/12* (2006.01)
*G06F 1/32* (2006.01)

(52) U.S. Cl.
CPC .............. *H04L 12/12* (2013.01); *G06F 1/3209* (2013.01); *G06F 1/3287* (2013.01); *Y02B 60/1282* (2013.01); *Y02B 60/34* (2013.01); *Y02B 60/35* (2013.01)
USPC .......................................... 713/324; 370/360

(58) Field of Classification Search
CPC ...... G06F 1/3253; G06F 1/3287; H04L 12/12; Y02B 60/34; Y02B 60/35
USPC ........................................... 370/360; 713/324
See application file for complete search history.

(56) References Cited

U.S. PATENT DOCUMENTS

| 7,830,882 | B2 | 11/2010 | Johnson |
| 8,397,092 | B2 | 3/2013 | Karnowski |
| 2008/0225877 | A1 | 9/2008 | Yoshida |
| 2009/0265569 | A1 | 10/2009 | Yonezawa et al. |
| 2011/0239014 | A1 | 9/2011 | Karnowski |
| 2013/0195104 | A1 | 8/2013 | Karnowski |

OTHER PUBLICATIONS

Notice of Allowance, Interview Summary and PTO-892 mailed Nov. 7, 2012, for U.S. Appl. No. 12/731,095, filed Mar. 24, 2010, 14 pages.

*Primary Examiner* — Albert Wang
(74) *Attorney, Agent, or Firm* — McAndrews, Held & Malloy, Ltd.

(57) ABSTRACT

A method for managing power consumption by a network device is disclosed. The network device includes first and second ports, each of the first and second ports identified by a unique identifier and adapted to handle separate network traffic. The method includes verifying that the first and the second ports are connected to a common network end node; shutting off a link between the first port and the network end node; obtaining the unique identifier of the first port; creating, on the second port, a virtual port in response to the unique identifier of the first port; discovering the virtual port on the network device; and redirecting traffic formerly routed through the link through the virtual port.

48 Claims, 4 Drawing Sheets

POWER MANAGEMENT FOR INPUT/OUTPUT DEVICES

CROSS-REFERENCE TO RELATED APPLICATIONS

This application is a continuation of U.S. patent application Ser. No. 12/731,095, filed Mar. 24, 2010, the entire disclosure of which is incorporated herein by reference in its entirety for all purposes.

FIELD OF THE INVENTION

This invention relates generally to power management in network systems and more specifically to power management of a network device having multiple connections to a network fabric.

BACKGROUND OF THE INVENTION

Power consumption is always a concern in managing an enterprise network system. A typical enterprise network, such as a storage network, may include a large number of network devices such as servers, switches, and storage devices. A number of those devices may be situated in a confined physical space. For example, multiple blade servers may be stacked in a single rack. During operation, electrical and mechanical components produce heat, which must be displaced to ensure proper functioning of the server components. In blade enclosures, as in most computing systems, heat may be removed with fans or reduced by the use of air conditioning. As servers become more powerful, more electricity is consumed by not only the servers but also the fans and/or the air conditioners needed to keep the servers cool. As such, it is desirable to find ways to reduce the power consumed by each network device without jeopardizing the operations of those devices or affecting their performance.

SUMMARY OF THE INVENTION

In general, the present invention relates to systems and methods to reduce power consumption of a network device by using virtualization techniques to migrate connectivity to a shared port on the network device.

Embodiments of the present invention utilize virtualization techniques to perform port migration on a network device. The virtualization techniques make it possible to encapsulate the characteristics of a first physical port and, based on the encapsulated characteristics, create a virtual port on a second physical port to perform the same functions of the first port. As a result, one or more power-consuming physical ports can be migrated to a single physical port. Those power-consuming ports can then be shut off to save power consumption by the device without losing any connectivity to other fabric-connected devices on the network. When it becomes necessary to switch to a powered-down physical port, or when Input/Output (I/O) bandwidth demand increases beyond the capacity of the single physical port, the same encapsulated characteristics can be re-applied to the first ports and those first ports can be reactivated to provide more bandwidth for the host server.

In one embodiment, the World Wide Port Name (WWPN) and World Wide Node Name (WWNN) of the first physical port are first noted. Subsequently, an N-Port ID Virtualization (NPIV)-based virtual port on the second port is created using the WWPN/WWNN of the first port so that the newly created virtual port can assume the identity of the first port. The virtual port may then be discovered by the host server and log into all the appropriate target storage devices on the network. After the connectivity between the virtual port and the storage devices is reestablished, I/O traffic to the server is resumed and redirected to the virtual port. Because the virtual port has adopted the same WWPN/WWNN as the powered-down first port, the host server would not know that the physical communication channels for some of its communication has been changed, that a virtual port on the second port, instead of the first port, is now being used to connect to target device. As far as the server is concerned, there has been no change in connectivity to the network. As such, the first physical port can be safely shut down without impacting the connectivity of the hosting server.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

In general, the present invention relates to systems and methods to reduce power consumption of a network device by using virtualization techniques to migrate connectivity to a shared port on the network device. Although the following embodiments of the invention are described specifically with reference to server-based HBAs, the methods and systems introduced herein can be extended to hardware environments other than those described below. Furthermore, though the embodiments are described for Fibre Channel networks, it should be understood that they can also be adapted for networks using other protocols, such as Fibre Channel over Ethernet (FCoE).

Figure 1:
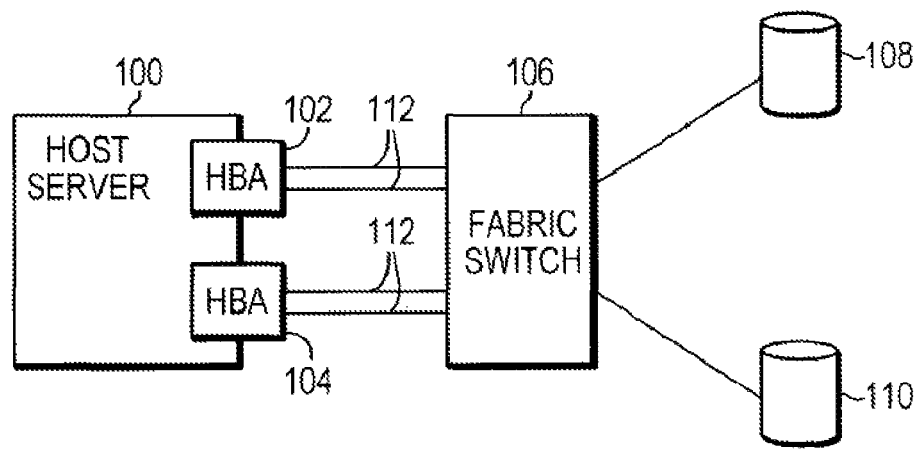
FIG. 1 is a block diagram illustrating a conventional Fibre Channel network including a storage device with two dual-port Fibre Channel Host Bus Adapters (HBAs).

FIG. 1 illustrates an exemplary Fibre Channel storage network. The Fibre Channel storage network includes a host server 100, a fabric switch 106 and two storage devices 108, 110. The host server 100 may be connected to the storage devices 108, 110 through the fabric switch 106. Although only two storage devices 108, 110 are illustrated, it should be understood that additional storage devices may be a part of the network and connected to the host server 100. The host server 100 includes two dual-port host bus adapters (HBAs) 102, 104. Each of the dual-port HBAs 102, 104 has two separate physical Fibre Channel ports (not shown) designed to provide two communication channels to the other devices on the network. Other networks may use multiple single-port adapters each with one physical Fibre Channel port in place of a dual-port HBA. Regardless of what type of HBA is used, each port on the HBAs 102, 104 is identifiable by a unique WWPN and/or a WWNN and may be designed to be independent of one another. In the network illustrated in FIG. 1, the two dual-port HBAs 102, 104 may together provide four connections 112 to the fabric switch 106. Each of these connections may be a full, physical connection that utilizes one of the physical FC ports on the HBAs 102, 104 and a dedicated optical fiber (or other physical transport means) connecting the HBAs 102, 104 to the fabric switch 106.

The fabric switch 106 may also include multiple ports (not shown) adapted to transmit and receive data from the host server 100. The fabric switch 106 may be connected to at least one of storage devices 108, 110. The fabric switch 106 may effectively determine, by the WWPNs associated with the ports on the host server 100 and the storage devices 108, 110, the connections between the host server 100 and each of the storage devices 108, 110. Although only one fabric switch 106 is illustrated in FIG. 1, it should be understood that the connections between the host server 100 and any one of the storage devices 108, 110 may go through multiple fabric switches. In other networks, the host server may be connected to different storage devices via different fabric switches.

Because the illustrated host server 100 of FIG. 1 has four separate connections 112 to the fabric switch 106, power may be continuously consumed by all of the four physical Fibre Channel ports on the two HBAs 102, 104 of the server 100 when the server is in operation. Similarly, the corresponding ports on the fabric switch 106 also may always be in a powered-on mode. When the devices are turned on, power may be continuously consumed regardless of whether or not any of the communication channels between the host server and the fabric switch 106 are being used to transmit data. That is, not all the bandwidth available from all the channels 112 may be needed all the time. In fact, it is very often the case that some channels between the server 100 and the fabric switch 106 may carry no data at a particular time. Those channels may exist for redundancy/failover purposes. In other words, some of the ports (or adapters) are present merely as backups to other ports (or adapters). In other networks, some of the channels may be present only for peak demand purposes. During off-peak times, far less bandwidth than the full available bandwidth is needed by the applications on the host server 100. This may be the case at night, when the usage of the network is typically much lower than during the day. Nevertheless, because all the ports in existing network devices are always on even when they are not actually in use for transmitting data, the amount of power consumed by the network during off-peak hours may not be any less than during peak usage.

Because each HBA 102, 104 typically has its own power supply, to the extent that the HBA or portions of the HBAs (e.g., the individual Fibre Channel port) can be shut down for a certain period of time when the bandwidth provided by that HBA 102, 104 is not needed, some power may be saved. Accordingly, it may be beneficial to shut down ports that are not currently being utilized for carrying data to save power and reduce heat generation. However, simply shutting down an adapter or a port on the adapter and dropping the link between that adapter/port and the fabric switch 106 may not be desirable because it may cause the loss of connection to the storage devices connected to the fabric switch 106. This in turn would cause loss of connection to the storage devices within the host server's operating system, creating a ripple effect that can yield unpredictable results from the perspective of applications running on the host server.

Embodiments of the present invention utilize virtualization techniques to perform port migration on a network device. The virtualization techniques make it possible to encapsulate the characteristics of a first physical port and, based on the encapsulated characteristics, create a virtual port on a second physical port to perform the same functions of the first port. As a result, one or more power-consuming physical ports can be migrated to a single physical port. Those power-consuming ports can then be shut off to save power consumption by the device without losing any connectivity to other fabric-connected devices on the network. When it becomes necessary to switch to a powered-down physical port, or when Input/Output (I/O) bandwidth demand increases beyond the capacity of the single physical port, the same encapsulated characteristics can be re-applied to the powered-down ports and those powered-down ports can be reactivated to provide more bandwidth for the host server.

Figure 2A:
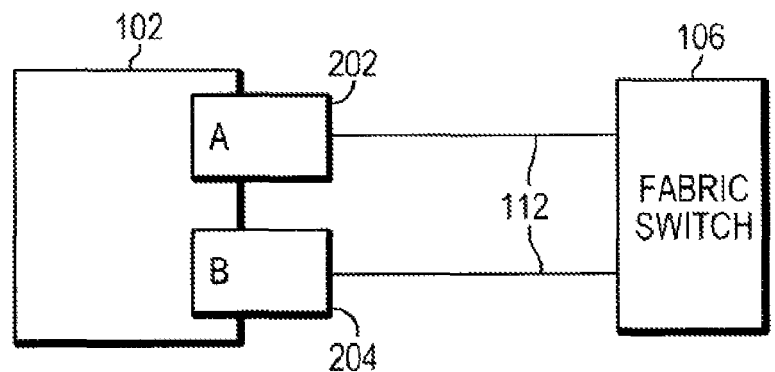
FIGS. 2a and 2b illustrate the connections between an HBA and a fabric switch before and after port migration has been performed according to an embodiment of the invention.
Figure 2B:
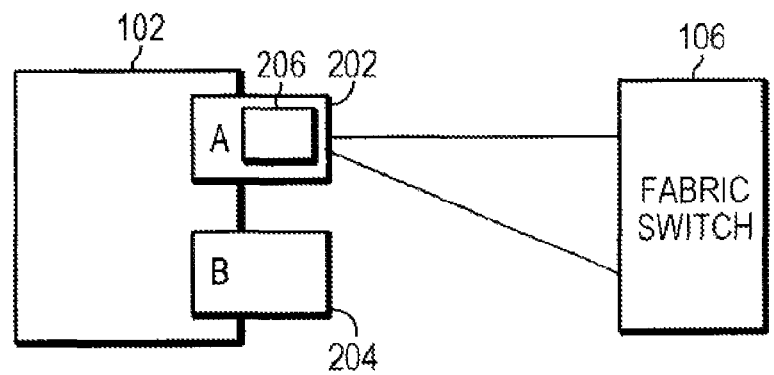

FIGS. 2a and 2b illustrate, respectively, one of the HBAs of FIG. 1 before and after port migration having been performed using virtualization techniques. First referring to FIG. 2a, one of the dual-port HBAs of FIG. 1 is shown in greater detail here. The HBA 102 may include two independent physical Fibre Channel ports A and B 202, 204. As illustrated in FIG. 2, both physical Fibre Channel ports A and B 202, 204 are in a powered-on mode. Each of the physical ports 202, 204 has a live connection to the fabric switch 208, through which the host server (not shown in FIGS. 2a and 2b) housing the HBA is connected to other devices, such as storage devices, on the network. However, as discussed previously, one of the physical ports (e.g., port 204) may be a failover for the other port (e.g., port 202). Alternatively, the HBA may not require the bandwidth provided by both physical ports 202, 204 at the same time. Thus, it is desirable to power down one of the physical ports by migrating the failover/unused physical port 204 to the active port.

In one embodiment of the invention, virtualization techniques may be used to create a virtual port on a physical port 202 (i.e., the second port) to take on the role of another physical port 204 (i.e., the first port) connected to a common fabric. FIG. 2b illustrates the dual-port HBA 102 of FIG. 2a having completed a port migration process. As illustrated in FIG. 2b, the previously active channel between the second Fibre Channel port 204 and the fabric switch 106 has been powered down. Instead, a virtual instance 206 of the second physical port 204 may be created in physical port 202 through a virtualization process, which will be discussed in detail below. The virtual port 206 may share the same WWPN/WWNN of the powered-down physical port 204 and perform the tasks that used to be performed by physical port 204. Preferably, the virtualization process is performed in a way that the host server housing the HBA 102 is not aware of the migration of the physical port 204 to the virtual port 206 and that the operation of the fabric switch 106 is unaffected by the migration. As far as the operating system (OS) and applications on the server are concerned, there has been no change in network connectivity to the rest of the network. Nevertheless, because one of the physical ports 204 has been turned off, electrical power that is typically required to run that physical port 204 is no longer needed. Even though the remaining physical port 202, hosting the virtual port 206, is now responsible for handling all connectivity of the HBA 102, it does not require additional power to run. As such, the total amount of power consumed by the HBA 102 maybe reduced as a result of this port migration process.

Figure 3:
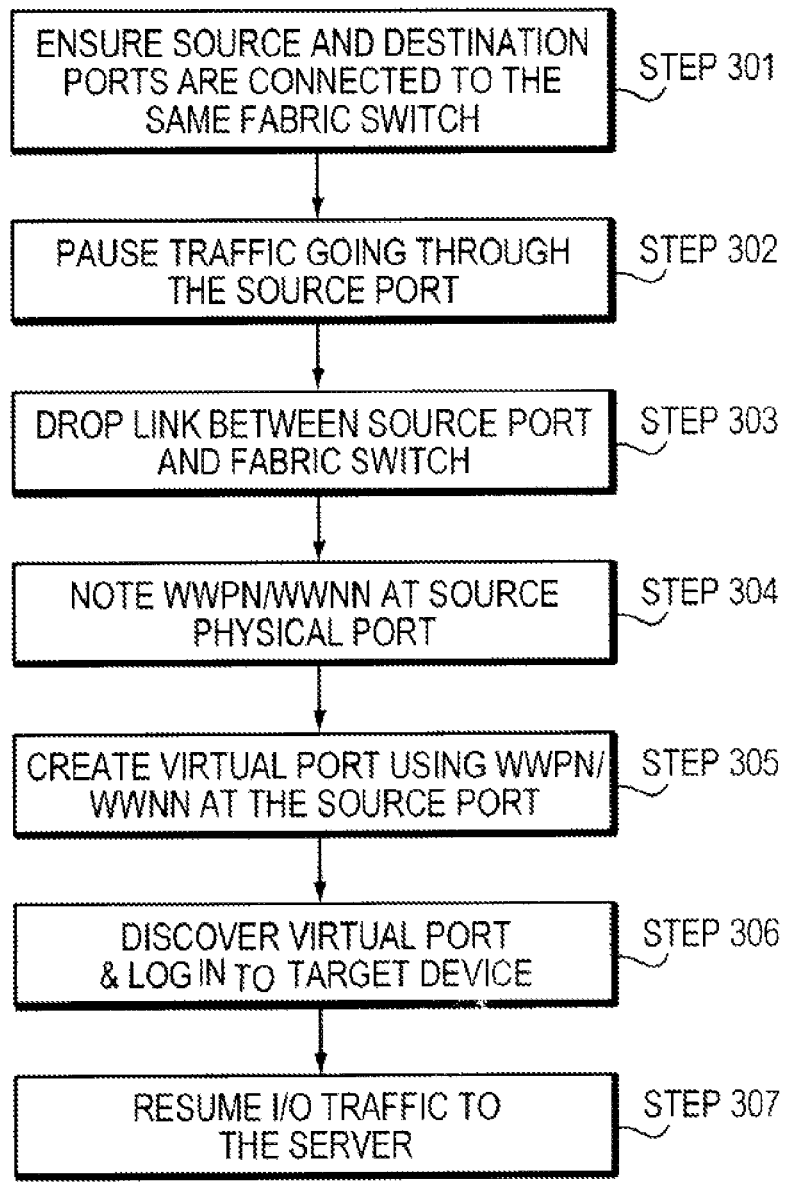
FIG. 3 is a flow chart illustrating the exemplary steps in migrating a physical port to another port using virtualization techniques according to an embodiment of the invention.

FIG. 3 illustrates exemplary steps of a method of port migration of a first physical port to a second physical port. Referring to FIG. 3, the first task is to ensure that the first and second ports are connected to the same fabric switch (step 301). This can be done by verifying the Fibre Channel fabric ID of the fabric switch. Next, all input/output traffic through the first port (i.e., the physical port to be migrated) is paused (step 302). The duration of the pause is ideally very short (e.g., about a second). After the traffic is cleared, the link between the first port and the fabric switch can be dropped (step 303). In other embodiments, other actions to reduce the power consumption of the first port may be additionally or alternatively performed.

As previously mentioned, to keep the connectivity of the host server intact, a virtual port must be created on the second port to replace the powered-down first port. The connectivity of the virtual port should be verified so that the host server can function seamlessly during and after the port migration process. Without the virtual port being ready to take over the connections from the first port, applications on the host server may encounter serious errors because the host server typically does not tolerate losing connection to remote devices, which may be used to store critical programs and data that the applications on the server need. Preferably, the migrating process should effectively create a transition to the virtual port in such a way that the OS and applications on the host server can function as usual without detecting the transition from the physical port and the virtual port.

According to this embodiment, the WWPN and WWNN of the first physical port are first noted (step 304). Subsequently, an NPIV-based virtual port on the second port is created using the WWPN/WWNN of the first port so that the newly created virtual port can assume the identity of the first port (step 305). The virtual port may then be discovered by the host server and log into all the appropriate target storage devices on the network (step 306). After the connectivity between the virtual port and the storage devices is reestablished, I/O traffic to the server is resumed and redirected to the virtual port (step 307). Because the virtual port has adopted the same WWPN/WWNN as the powered-down first port, the host server would not know that the physical communication channels for some of its communication has been changed, that a virtual port on the second port, instead of the first port, is now being used to connect to target device. As far as the server is concerned, there has been no change in connectivity to the network. As such, the first physical port can be safely shut down without impacting the connectivity of the hosting server. The process can be carried out for other ports on the same HBA or different HBAs of the server.

Although the migration of one physical port to another physical port is described above, it is to be understood that multiple ports can be migrated to a single second port in the same way as long as the second port has enough bandwidth for network traffic. If all physical ports of one HBA are migrated to one or more physical ports on another HBA, the first HBA can be shut off completely. The more physical ports that can be virtualized on the second port, the more power can be saved by shutting down these physical ports.

In another embodiment, the port to be migrated can itself be a virtual port. The same virtualization technique can be used to migrate one or more virtual ports on a first physical device (e.g., a first physical port) to a port of a second physical device. After all of the virtual ports of the first physical device are migrated to the second device, the first physical device can be shut off to save power.

As such, according to embodiments of the invention, a tradeoff may be made between the aggregated bandwidth of the host server and the amount of power that can be saved. The virtualization process discussed in the embodiments can be performed seamlessly, without any significant interruptions to the operation of the host server. In addition, if the host server shuts down one of more of its physical ports, the corresponding ports on the fabric switch can be optionally turned off. That may reduce the power consumption by the fabric switch.

The existence of the virtual port on the second port allows the first physical port to be shut down as long as there is sufficient network bandwidth to handle communication from and to the server. Whenever the demand for bandwidth increases, the virtual port on the second port can be shut down and first port can be restarted to provide additional bandwidth. Basically, the above-described virtualization process in FIG. 3 can be reversed. Similarly, if the second port encounters an error and has to be shut down, the virtual port can be terminated and the first port can be powered up again to serve as a backup to the second port. According to embodiments of the invention, whenever a physical port is reactivated, the corresponding virtual port may be shut off.

In another aspect of the invention, different methods can be used to determine when to initiate the above-described port migration process to reduce power consumption. In one embodiment, a time-based algorithm is used where the migration of ports is scheduled at a predetermined time, for example, at midnight when usage of the servers on the network is typically at its lowest level. Knowing that the access rate for I/O operations is much less at that time of the day, the servers may automatically switch the network adapters to a low-power mode by shutting off one or more physical ports on one or more the adapters of the servers using virtualization techniques as described above.

Figure 4:
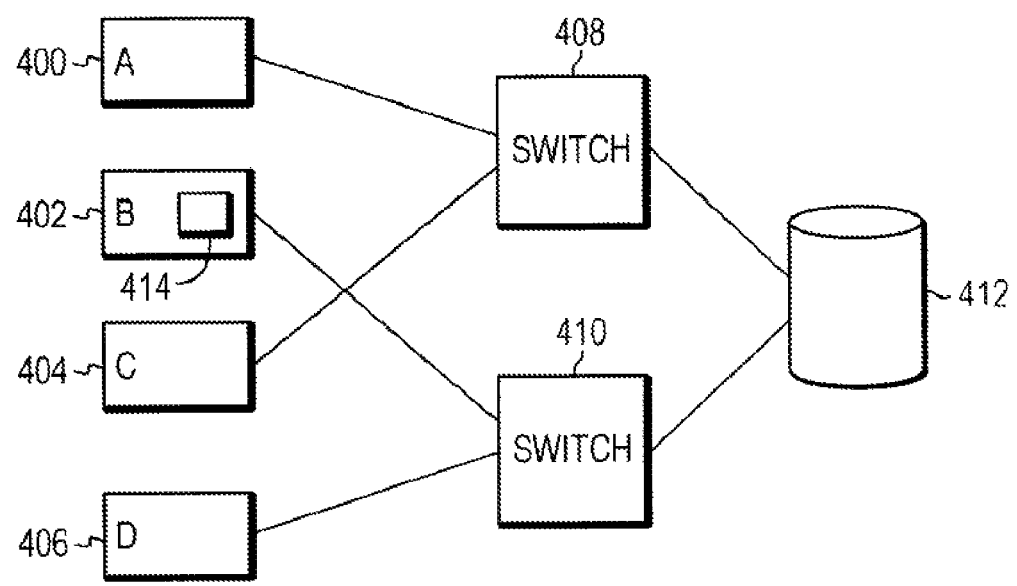
FIG. 4 illustrates a redundant network adapted to utilize the power saving methods disclosed in embodiments of the invention.

In another embodiment, the servers may be running in a power saving mode (i.e., using virtual ports for network connections) unless there is a need to initiate failover procedures in response to problems with the active adapter or physical port on which the virtual ports are created. Typical high-availability systems may include multiple hardware components (e.g., HBAs) and network paths that are redundant. That is, some of the network adapters or ports serve as backups to other adapters/ports. FIG. 4 illustrates an example of a redundant system. The redundant system includes four network ports A-D 400, 402, 404, 406, two fabric switches 408, 410, and a storage device 412. The network ports 400, 402, 404, 406 may be a part of one or more HBAs or other types of network cards. Two of the ports (A and C) 400, 404 are active I/O ports connected to the storage device 412 through fabric switch 408. Ports B and D 402, 406 are failover ports for ports A and C 400, 404, respectively. Both ports B and D 402, 406 are connected to the storage device 412 through a second switch 410, which serves as a backup to switch 408.

As illustrated in FIG. 4, the redundant network ports 400, 402, 404, 406 and fabric switches 408, 410 are designed to provide multiple paths to the storage device 412. For example, if port A 400 fails, its backup port B 402 may be activated and connection to the storage device 412 may be re-established through port B 402. Similarly, if the connection between active port C 404 and the storage device 412 is interrupted, port D 406, the backup port for port C 404, may be powered up and used to access the remote storage device 412.

To save power in this type of redundancy setup, one of the failover ports B and D 402, 406 may be shut down and a virtual port 414 may be created on the remaining failover port (e.g., port B). This virtualization process of the port can be carried out according to the exemplary embodiments described above. The virtual port 414 has the connectivity and assumes the identity of the turned-off port D 406, and can still serve as a backup port to port C 404. In this example, port B 402 is essentially the only active backup port for both ports A and C 400, 404 during normal operation. However, at the command of a failover application, the powered-down physical port D 406 could be re-established to support failover to a separate, redundant physical port (e.g., port B).

In another embodiment, a prediction-based method can be used to schedule port migration. In this embodiment, the use of physical ports can be controlled by an algorithm designed to predict the I/O load based on past system behavior. In particular, if the I/O load was previously relatively low when the system was in a certain state, port migration may be initiated if the same state occurs again.

Some conventional application-specific integrated circuits (ASICs) may have mechanisms to shut down portions of its circuit to be able to reduce its overall power consumption. In another aspect of the invention, an ASIC having multiple ports and adapted to perform the power-saving port migration process described above is provided. Any ports or other hardware blocks of the ASIC can be shut off to save power. Given the large number of ASICs that can be found in devices of a conventional network, the potential saving in power consumption can be significant if the ASIC can be programmed to perform the disclosed port migration process.

In another aspect of the invention, further power savings can be achieved by controlling the hardware associated with the switch ports. Using the data path that exists between the physical port and the fabric switch, commands could be transmitted to the fabric switch to instruct it to shut down one or more physical ports connected to the now-powered-down host based ports. Alternatively, the fabric switch can be instructed to switch to a lower power state (i.e., power saving mode) to reduce power consumption. When the time comes to re-establish the physical connection, a similar power up command could be used.

Various embodiments of the invention can be implemented in software or firmware of the device or a combination of both. For example, if port migration in a particular device is time-based, the timer may be an application running on the server. The application has to communicate to the kernel space where the driver resides. The device driver is another software entity that controls the operation of the hardware (e.g., an HBA) by instructing the firmware residing in the hardware to carry out the requisite steps of the virtualization process. In this embodiment, the application is the entity that makes the decision regarding when to initiate the port migration process. When the scheduled time arrives, the application may issue a command to the driver and, in response, the driver may issue a command to pause I/O operation in the designated hardware (e.g., one or more Fibre Channel ports) and then create the virtual ports on the still active port(s). I/O operation can be resumed after the virtual port(s) is discovered by the host server. The firmware associated with the hardware (e.g., HBA) may be responsible for shutting down physical ports to conserve power used by the adapter.

Figure 5:
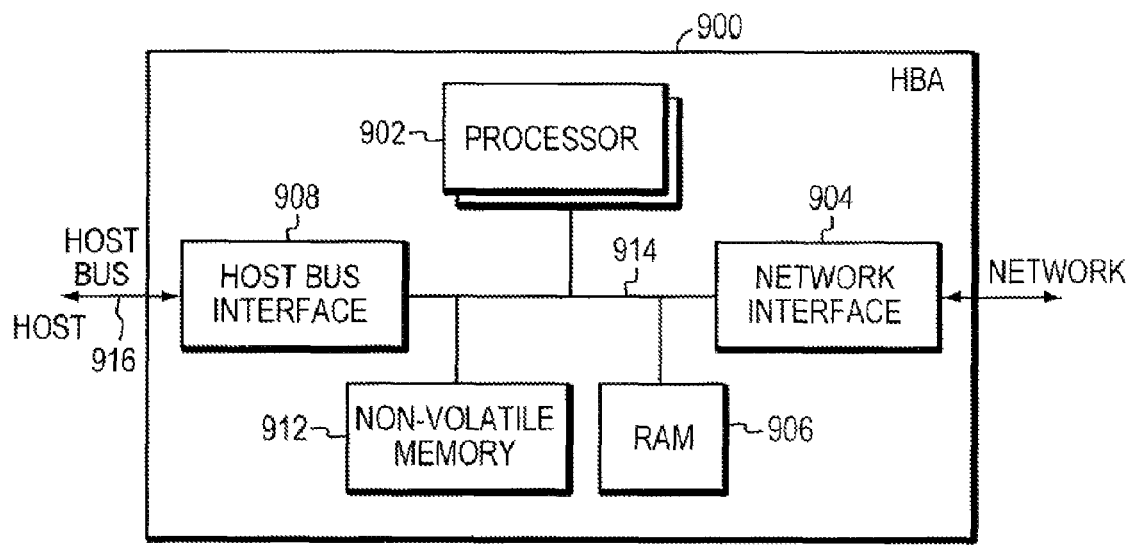
FIG. 5 illustrates an embodiment of a network adapter that may adopt the power saving methods disclosed in embodiments of the invention.

FIG. 5 illustrates another embodiment of an HBA according to embodiments of the invention. As illustrated, the HBA 900 includes one or more processors 902, a network interface 904, a host bus interface 908, and computer readable storage media, such as Random Access Memory (RAM) 906 and non-volatile memory 912. The various components of the HBA 900 are all connected to a bus 914 in the HBA 900 and adapted to communicate with each other using the bus 914. The RAM 912 and the non-volatile memory 906 may be used to store firmware of the HBA 900 and other data. In other embodiments, the firmware may be stored on an external computer-readable storage medium such as a disk and loaded into the HBA 900 during operation. The host bus interface 908 connects the HBA 700 to its host via a host bus 910. The network interface 904 provides a gateway to an external network.

Figure 6:
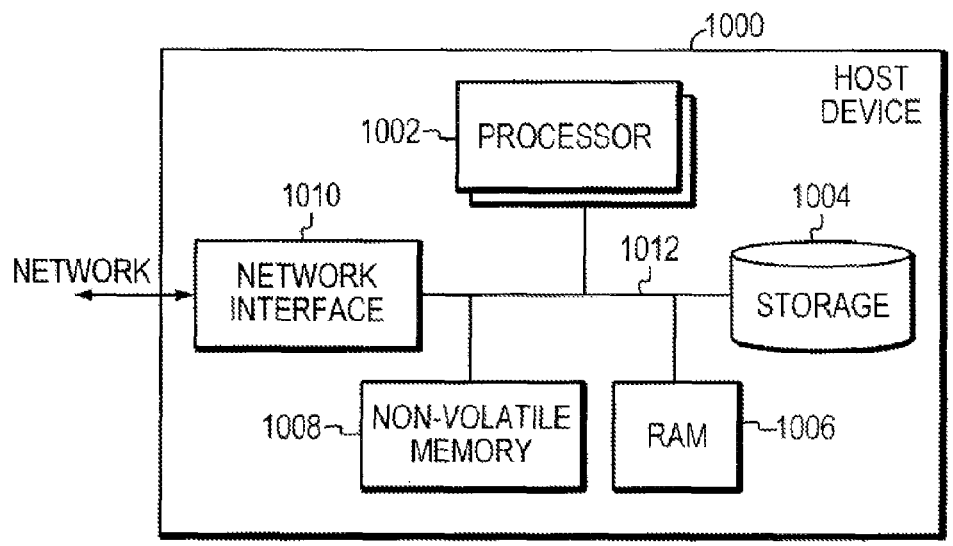
FIG. 6 illustrates an exemplary host server according to an embodiment of the invention.

FIG. 6 illustrates an exemplary host device according to an embodiment of the invention. The host device 1000 includes one or more processors 1002, a storage device 1004, a network interface 1010, RAM 1006, and non-volatile memory 1008. The host device 1000 may also include one or more device drivers and one or more HBAs (not shown) as described above in view of FIG. 5. The processor 1002 may execute instructions stored in computer-readable storage media such as the RAM 1006 and the non-volatile memory 1008. The storage device 1004 may be a disk capable of storing programs such as firmware for the HBA. The host device is adapted to transmit and receive data from the network using the network interface 1010.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method comprising:
   verifying that first and second ports of a network device are connected to a common network end node;
   shutting off a link between the first port and the network end node;
   creating, on the second port, a virtual port based on a port identifier of the first port; and
   directing traffic through the virtual port.

2. The method of claim 1, further comprises the steps of:
   pausing traffic being routed through the first port; and
   resuming the paused traffic to and from the network device through the virtual port.

3. The method of claim 1, wherein the first and second ports are physical ports.

4. The method of claim 1, wherein the first port is a virtual port on a physical device separate from the second port.

5. The method of claim 1, wherein the network device is an HBA.

6. The method of claim 1, wherein the network device is a server and the first and second physical ports are two HBAs.

7. The method of claim 1, wherein the network traffic comprises communication over a Fibre Channel network or a Fibre Channel over Ethernet network.

8. The method of claim 1, wherein the port identifier associated with the first port and a port identifier associated with the second physical port are the WWPNs of the first and the second ports, respectively.

9. The method of claim 1, further comprising determining when to initiate a power saving mode of the network device.

10. The method of claim 9, wherein determining when to initiate the power saving mode of the network device is in response to a total bandwidth of the first and the second ports and an actual bandwidth needed by the network device.

11. The method of claim 9, wherein the first port and the second port are redundant, and wherein determining when to initiate the power saving mode of the network device is in response to a failover procedure of the network device.

12. The method of claim 9, wherein determining when to initiate the power saving mode of the network device is in response to past activities of the network device.

13. The method of claim 9, wherein determining when to initiate the power saving mode of the network device is in response to a pre-determined schedule.

14. The method of claim 1, further comprising:
sending a command to the network end node to shut off at least one physical port on the network end node connected to the first port of the network device.

15. The method of claim 1, further comprising:
sending a command to the network end node to switch the network end node to a lower power state.

16. The method of claim 1, further comprising:
turning off the virtual port; and
activating the first port.

17. The method of claim 16, wherein the first port is activated in response to a failover procedure.

18. The method of claim 16, wherein the first port is activated in response to a demand for more bandwidth by the network device.

19. The method of claim 1, wherein the first port is a part of an ASIC, and wherein the method further comprises shutting down part of the ASIC including the first port.

20. A network device comprising:
first and a second ports, the network device configured for:
verifying that the first and the second ports are connected to a common network end node;
shutting off a link between the first port and the network end node;
creating, on the second port, a virtual port based on a port identifier of the first port; and
directing traffic through the virtual port.

21. The network device of claim 20, wherein the network device is further configured for:
pausing traffic being routed through the first port; and
resuming the paused traffic to and from the network device through the virtual port.

22. The network device of claim 20, wherein the first and second ports are physical ports.

23. The network device of claim 20, wherein the first port is a virtual port on a physical device separate from the second port.

24. The network device of claim 20, wherein the first and the second ports are ports on an HBA.

25. The network device of claim 20, wherein the network device is a server and the first and second ports are two HBAs.

26. The network device of claim 20, wherein the network device is further configured for utilizing Fibre Channel communications.

27. The network device of claim 20, wherein the network device is further configured for utilizing Fibre Channel over Ethernet communications.

28. The network device of claim 20, wherein the port identifier associated with the first port and a port identifier associated with the second physical port are the WWPNs of the first and the second ports, respectively.

29. The network device of claim 20, wherein the network device is further configured for determining when to initiate a power saving mode of the network device.

30. The network device of claim 20, wherein the network device is hardware associated with a switch.

31. A host server comprising the network device of claim 20.

32. A non-transitory machine-readable storage medium storing instructions that, when executed by one or more processors, cause a machine to perform a method comprising:
verifying that a first port and a second port of a network device are connected to a common network end node;
shutting off a link between the first port and the network end node;
creating, on the second port, a virtual port based on a port identifier of the first port; and
directing traffic through the virtual port.

33. The non-transitory machine-readable storage medium of claim 32, the method further comprising:
pausing traffic being routed through the first port; and
resuming the paused traffic to and from the network device through the virtual port.

34. The non-transitory machine-readable storage medium of claim 32, wherein the first and second ports are physical ports.

35. The non-transitory machine-readable storage medium of claim 32, wherein the first port is a virtual port on a physical device separate from the second port.

36. The non-transitory machine-readable storage medium of claim 32, wherein the first port and the second port are adapted to handle separate network traffic.

37. The non-transitory machine-readable storage medium of claim 36, wherein the network traffic comprises communication over a Fibre Channel network or a Fibre Channel over Ethernet network.

38. The non-transitory machine-readable storage medium of claim 32, wherein the first and the second ports are identified by their respective WWPNs.

39. The non-transitory machine-readable storage medium of claim 32, the method further comprising determining when to initiate a power saving mode of the network device.

40. The non-transitory machine-readable storage medium of claim 39, wherein determining when to initiate the power saving mode of the network device is in response to a total bandwidth of the first and the second ports and an actual bandwidth needed by the network device.

41. The non-transitory machine-readable storage medium of claim 39, wherein the first physical port and the second port are redundant, and wherein determining when to initiate the power saving mode of the network device is in response to a failover procedure of the network device.

42. The non-transitory machine-readable storage medium of claim 39, wherein determining when to initiate the power saving mode of the network device is in response to past activities of the network device.

43. The non-transitory machine-readable storage medium of claim 39, wherein determining when to initiate the power saving mode of the network device is in response to a predetermined schedule.

44. The non-transitory machine-readable storage medium of claim 32, the method further comprising:
sending a command to the network end node to shut off at least one physical port on the switch connected to the first port of the network device.

45. The non-transitory machine-readable storage medium of claim 32, the method further comprising:
sending a command to the network end node to switch the network end node to a lower power mode.

46. The non-transitory machine-readable storage medium of claim 32, the method further comprising:
turning off the virtual port; and
activating the first port.

47. The non-transitory machine-readable storage medium of claim 46, wherein the first port is activated in response to a failover procedure.

48. The non-transitory machine-readable storage medium of claim 46, wherein the first port is activated in response to a demand for more bandwidth by the network device.

* * * * *